(12) United States Patent
Lee et al.

(10) Patent No.: US 9,365,130 B2
(45) Date of Patent: Jun. 14, 2016

(54) SYSTEM AND METHOD FOR SUPERCHARGING FUEL CELL

(71) Applicants: Hyundai Motor Company, Seoul (KR); Kia Motors Corporation, Seoul (KR)

(72) Inventors: Kyu Il Lee, Gyeonggi-Do (KR); Ji Tae Kim, Gyeonggi-Do (KR); Jae Won Jung, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/476,092

(22) Filed: Sep. 3, 2014

(65) Prior Publication Data

US 2015/0321579 A1    Nov. 12, 2015

(30) Foreign Application Priority Data

May 12, 2014    (KR) .................. 10-2014-0056666

(51) Int. Cl.
*B60L 9/00*    (2006.01)
*B60L 11/18*    (2006.01)
*H01M 8/04*    (2016.01)

(52) U.S. Cl.
CPC ......... *B60L 11/1881* (2013.01); *B60L 11/1887* (2013.01); *H01M 8/04753* (2013.01); *H01M 8/04992* (2013.01); *H01M 2250/20* (2013.01)

(58) Field of Classification Search
CPC ........... B60L 11/18; G06F 19/00; H01M 8/04
USPC .................... 701/22; 180/65.1–65.8
See application file for complete search history.

(56) References Cited

U.S. PATENT DOCUMENTS

| 6,488,345 B1 * | 12/2002 | Woody et al. ............... 303/152 |
| 2009/0105895 A1 * | 4/2009 | Shige ............................ 701/22 |
| 2011/0213516 A1 * | 9/2011 | Choi et al. ..................... 701/22 |

FOREIGN PATENT DOCUMENTS

| JP | 05-328522 A | 12/1993 |
| JP | 2007-020244 A | 1/2007 |
| JP | 2009-054397 A | 3/2009 |
| KR | 10-2008-0032648 A | 4/2008 |
| KR | 10-2011-0036448 | 4/2011 |
| KR | 10-2013-0036531 | 4/2013 |
| WO | 2008/007689 A1 | 1/2008 |

* cited by examiner

*Primary Examiner* — Luke Huynh
(74) *Attorney, Agent, or Firm* — Mintz Levin Cohn Ferris Glovsky and Popeo, P.C.; Peter F. Corless

(57) ABSTRACT

A technique for supercharging a fuel cell is provided. In particular, a speed of an acceleration pedal is calculated and a first output order value of a fuel cell stack or a second output order value of the fuel cell stack which is smaller than the first output order value is set, in accordance with the value of the calculated speed. An amount of air flow corresponding to the set first output order value or the second output order value to be supplied to the fuel cell stack is then controlled accordingly.

14 Claims, 2 Drawing Sheets

SYSTEM AND METHOD FOR SUPERCHARGING FUEL CELL

CROSS-REFERENCE TO RELATED APPLICATION

The present application claims priority of Korean Patent Application Number 10-2014-0056666 filed on May 12, 2014, the entire contents of which application are incorporated herein for all purposes by this reference.

BACKGROUND (a) Technical Field

The present invention relates to a technique for supercharging a fuel cell, and more particularly, to a technique for supercharging a fuel cell, in which an amount of air flow to be supercharged is controlled considering an acceleration intention of a driver.

(b) Description of the Related Art

Generally, a motor is driven using power from fuel cells in a fuel cell vehicle and the power from fuel cells is generated through a reaction between hydrogen and oxygen. Here, the oxygen is often supplied from atmospheric air using an airblower. At this time, the output from a fuel cell stack is determined by the supplied hydrogen and necessary oxygen, that is, atmospheric air needs to be supplied in advance so as to output a set power.

When air is not supplied sufficiently, hydrogen is not reacted sufficiently with oxygen and thus necessary power cannot be output, and in this case acceleration performance is limited, thereby deteriorating product commerciality. When an air-blower is driven rapidly while a driver steps down an accelerator pedal in order to satisfy the acceleration performance, power is output promptly from a fuel cell. However, when this happens energy is lost due to air supercharging and the inside of a fuel cell stack dries out, thereby decreasing the performance of the fuel cell stack.

The description provided above as a related art of the present invention is just for helping in understanding the background of the present invention and should not be construed as being included in the related art known by those skilled in the art.

SUMMARY

An object of the present invention provides a technique for supercharging a fuel cell, in which the amount of oversupplied air flow is controlled by determining acceleration intention of a driver and adjusting the power requested to a fuel cell stack in accordance with the determined acceleration intention, thereby preventing energy loss and decreased performance of the fuel cell stack due to air supercharging.

A method for supercharging a fuel cell according to the present invention may include calculating a speed of an acceleration pedal; setting a first output order value of a fuel cell stack or a second output order value of the fuel cell stack which is less than the first output order value, in accordance with the value of the calculated speed; and controlling an amount of air flow to be supplied to the fuel cell stack corresponding to the set first output order value or the second output order value.

The method for supercharging a fuel cell may further include an acceleration-recognizing step that determines as an accelerated state when the calculated speed is greater than a reference speed by comparing the calculated speed at the calculation step to a set reference speed.

The method for supercharging a fuel cell may further include a reset step for releasing the acceleration intention state when the detected step-down amount of an acceleration pedal (i.e., the amount an accelerator is depressed) is smaller than a set reference step-down amount by comparing the detected step-down amount of an acceleration pedal to the preset reference step-down amount.

In the case of current acceleration intention state, the first output order value of the fuel cell stack may be set in the setting step. The first output order value may correspond to an output value requested by a driver. When it is not in the currently acceleration intention state, the second output order value of the fuel cell stack may be set in the setting step. The second output order value may be the value corresponding to a total available output value calculated by adding an available output value of a fuel cell stack corresponding to the amount of air flow currently supplied to a currently available output value of a battery.

When the vehicle is not currently in an acceleration intention state, the second output order value may be set in the setting step in case the output value requested by a driver is greater than the total available output value during a comparison step.

When the vehicle is not currently in an acceleration intention state, the first output order value may be set in the setting step in case the output value requested by a driver is not greater than the total available output value during a comparison step,

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

Figure 1A:
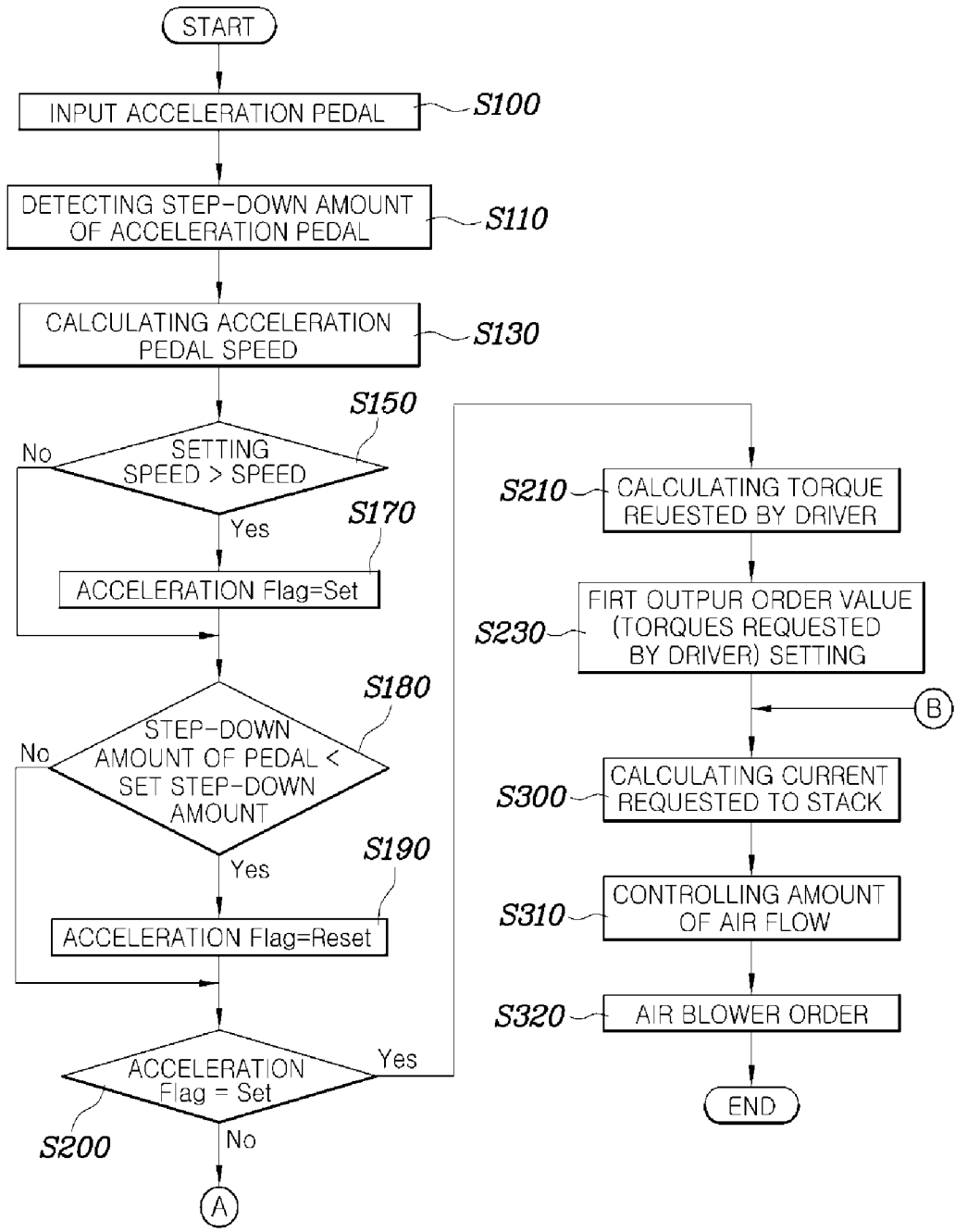
FIGS. 1A and 1B are a flow chart showing a method for supercharging a fuel cell according to an embodiment of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Exemplary embodiments of a method for supercharging a fuel cell according to an embodiment of the present invention are described hereafter in detail with reference to the accompanying drawings.

Figure 1B:
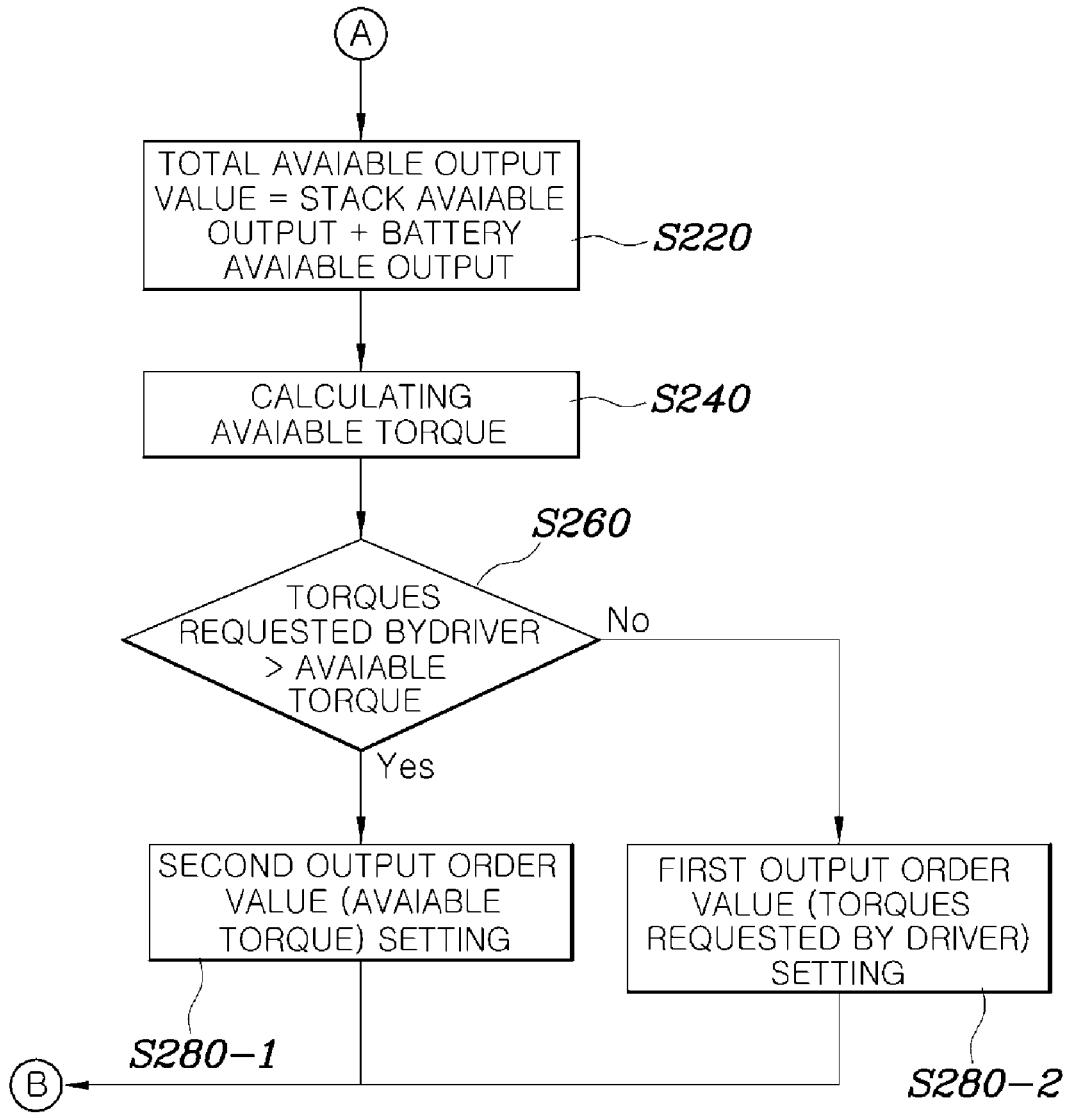

FIGS. 1A and 1B are a flow chart showing a method for supercharging a fuel cell according to an exemplary embodiment of the present invention, wherein the method for supercharging a fuel cell may include the steps of: calculating the speed at which an acceleration pedal is depressed S130; setting a first output order value or a second output order value of a fuel cell stack which is less than the first output order value, in accordance with the value of the calculated speed S230, S280-1, and S280-2; and controlling the amount of air flow to be supplied to the fuel cell stack corresponding to the set first output order value or second output order value S310, S320.

In more detailed description of the method for supercharging a fuel cell according to an exemplary embodiment of the present invention, the calculating step S130 is performed when an acceleration pedal is input S100. In particular, the speed of an acceleration pedal refers to a step-down speed of an acceleration pedal as a differential value of a step-down amount of the acceleration pedal. That is, the power requested by the acceleration pedal is calculated by detecting the step-down amount of an acceleration pedal S110 and differentiating the detected step-down amount S130, before performing the calculation step S130. In the present exemplary embodiment, the speed of an acceleration pedal is calculated in the calculation step. However, acceleration thereof may be calculated by any known method.

After the calculation step S130 is performed, an acceleration recognizing step S170 for determining whether a driver is currently intending on accelerating the vehicle may be performed when the calculated speed is greater than a reference speed by comparing the calculated speed from the calculation step S130 to a set reference speed S150.

The reference speed refers to as a speed value to determine that a driver has an intention of acceleration, and may be set variously depending on a designer's intention. Further, determining that a driver has an intention of acceleration means that the pedal is currently being depressed so that the vehicle accelerates.

By comparing the speeds of stepping-down a pedal by a driver S150 a controller executing the calculation steps can determine whether the driver is depressing a pedal to accelerate or to maintain a normal driving speed and thus the air supercharging amount can be increased instantly only when the driver intends on accelerating, thereby preventing a dry-out of a fuel cell stack and damage to the inside thereof.

Meanwhile, after the acceleration recognizing step S170, a reset step S190 for releasing the acceleration intention state may be further performed when the detected step-down amount of an acceleration pedal is less than a set reference step-down amount by comparing the detected step-down amount of an acceleration pedal to the set reference step-down amount S180. The releasing of acceleration intention state means that of the set acceleration intention state is released or ended.

Accordingly, by considering the step-down amount of the acceleration pedal the acceleration intention in addition to the speed of the acceleration pedal, the acceleration intention of a driver can be determined by distinguishing between when a driver steps-down the acceleration pedal with acceleration intention from when the acceleration pedal is stepped-down quickly due to vehicle vibration or other external causes.

Meanwhile, the first output order value of a fuel cell stack is set in the setting step S230 in the case of a current acceleration intention state and here the first output order value may be an output value requested by a driver.

The setting of the first output order value or the second output order value means a designation of the output value requested to the fuel cell stack, wherein the output of the fuel cell stack in accordance with the set order value among the first output order value and the second output order value, that is, the electric current value to be generated by the fuel cell stack is calculated S300, and the amount of air flow to be required is calculated S310, and then the flow amount of air is controlled by driving an air blower S320 in the control steps S310, S320.

Accordingly, when the currently acceleration intention state is set in step S200 in order to set the first output order value S230, the output value requested by a driver is calculated S210 based on the acceleration and step-down amount of an acceleration pedal, and the control steps S310, S320 are performed by setting the calculated output value requested by a driver (i.e., the first output order value). At this time, the output value requested by a driver may be a torque value requested by a driver.

The output value requested by a driver does not necessarily need to be calculated after the acceleration intention state is set, and it may be calculated simultaneously with the speed of an acceleration pedal after detecting the step-down amount of the acceleration pedal or in advance after detecting the step-down amount thereof. The time for calculating the output value requested by a driver may be set variously. The torques value requested by a driver may also be calculated in a way of map data that is set in advance from experiments, but it is not limited thereto.

Meanwhile, when not in the acceleration intention state currently, the second output order value of a fuel cell stack is set in the setting step S280-2. The second output order value may be a torque value corresponding to a total available output value calculated by adding an available output value of a fuel cell stack corresponding to the amount of air flow currently supplied to a currently available output value of a battery.

The available output value of a fuel cell stack is the available output value in an air supplying state before the control step is performed by the first output order value and the second output order value, and it may be an output value that is generated by a fuel cell stack in a current state, that is, an output electric current value. Further, the currently available output value may be an electric current amount that is remained currently in a battery.

Accordingly, when not in the currently acceleration intention state, the total available output value is calculated S220, the torque value corresponding to the total available output value is calculated S240, and it is compared whether the output value requested by a driver is greater than the torque value corresponding to the calculated total available output value S260. Here, when the output value requested by a driver is greater than the torque value corresponding to the calculated total available output value, the second output order value is set as the output value requested to the fuel cell stack S280-2.

The total available output value is not necessary to be calculated after the determination of the currently acceleration intention state, and it may, however, be calculated at any time. The corresponding torque value may be calculated by the preset data map, but it is not limited thereto.

Further, when the vehicle is not in the acceleration intention state currently, a comparison is made as to whether the output value requested by a driver is greater than the torque value corresponding to the total available output value S260, and when the output value requested by a driver is not greater than the torque value corresponding to the total available output value, the first output order value may be set as the output value requested to the fuel cell stack S280-1.

Meanwhile, the control steps S310, S320 may be performed such that the output value requested by a driver is calculated as the electric current value requested to a fuel cell stack and the total available output value calculated as an electric current value itself is used as the electric current value requested to the fuel cell stack, without calculating separately the torque requested by a driver or the torque value corresponding to the total available output value S240 and then calculating the current value requested to the fuel cell stack corresponding to the torque value S300. Additionally, the first output order value, the second output order value, and the output value requested by a driver refer are electric current values.

According to a method for supercharging a fuel cell configured as above, the electric current requested to a fuel cell stack is doubled through the determination of acceleration intention of a driver and thus the air supercharging which occurs when calculating the electric current requested to the fuel cell stack through the torque requested by a driver and the performance deterioration of the fuel cell stack which is caused from the drying-out inside thereof, can be prevented, and at the same time, the performance deterioration of acceleration can be solved, thereby improving fuel efficiency and acceleration performance.

In more detail, the amount of air flow is increased instantly to generate the requested torque by a driver to improve acceleration when the driver accelerates. However, when the torque value requested by a driver is greater than the torque value corresponding to the total available output value while a driver is driving at a constant speed, power is to be output within a range by adding an available output of a battery to the output of the fuel cell stack corresponding to the amount of currently supplied air flow, instead of increasing the amount of air flow, thereby preventing energy loss and the performance deterioration of the fuel cell stack that may occur by excessively increasing the amount of air flow to improve fuel efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for supercharging a fuel cell, comprising:
   calculating, by a controller, a speed of an acceleration pedal;
   setting, by a controller, a first output order value of a fuel cell stack or a second output order value of the fuel cell stack which is less than the first output order value, in accordance with the calculated speed;
   controlling, by the controller, an amount of air flow to be supplied to the fuel cell stack based on the set first output order value or the second output order value;
   determining, by the controller, whether a vehicle is in an accelerated state when the calculated speed is greater than a reference speed by comparing the calculated speed to a preset reference speed; and
   resetting, by the controller, for releasing the acceleration intention state when a step-down amount of an acceleration pedal is less than a preset reference step-down amount by comparing the detected step-down amount of an acceleration pedal to the preset reference step-down amount.

2. The method of claim 1, wherein when the vehicle is in the acceleration intention state, and the first output order value of the fuel cell stack is set in the setting step.

3. The method of claim 1, wherein the first output order value corresponds to an output value requested by a driver.

4. The method of claim 1, wherein when the vehicle is not in the acceleration intention state, the second output order value of the fuel cell stack is set.

5. The method of claim 1, wherein the second output order value is the value corresponding to a total available output value calculated by adding an available output value of a fuel cell stack corresponding to the amount of air flow currently supplied to a currently available output value of a battery.

6. The method of claim 5, wherein when the vehicle is not in the acceleration intention state, the second output order value is set when the output value requested by a driver is greater than the total available output value.

7. The method of claim 5, wherein when the vehicle is not in the acceleration intention state, the first output order value is set when the output value requested by a driver is not greater than the total available output value.

8. A non-transitory computer readable medium containing program instructions executed by a processor or controller, the non-transitory computer readable medium comprising:
   program instructions that calculate a speed of an acceleration pedal;
   program instructions that set a first output order value of a fuel cell stack or a second output order value of the fuel cell stack which is less than the first output order value, in accordance with the calculated speed;
   program instructions that control an amount of air flow to be supplied to the fuel cell stack based on the set first output order value or the second output order value;
   program instructions that determine whether a vehicle is in an accelerated state when the calculated speed is greater than a reference speed by comparing the calculated speed to a preset reference speed; and program instructions that reset for releasing the acceleration intention state when step-down amount of an acceleration pedal is less that a preset reference step-down amount by comparing the detected step-down amount of an acceleration pedal to the preset reference step-down amount.

9. The non-transitory computer readable medium of claim 8 wherein when the vehicle is in the acceleration intention state, the first output order value of the fuel cell stack is set in the setting step.

10. The non-transitory computer readable medium of claim 8, wherein the first output order value corresponds to an output value requested by a driver.

11. The non-transitory computer readable medium of claim 8 wherein when the vehicle is not in the acceleration intention state, the second output order value of the fuel cell stack is set.

12. The non-transitory computer readable medium of claim 8, wherein the second output order value is the value corresponding to a total available output value calculated by adding an available output value of a fuel cell stack corresponding to the amount of air flow currently supplied to a currently available output value of a battery.

13. The non-transitory computer readable medium of claim 12, wherein when the vehicle is not in the acceleration intention state, the second output order value is set when the output value requested by a driver is greater than the total available output value.

14. The non-transitory computer readable medium of claim 12, wherein when the vehicle is not in the acceleration intention state, the first output order value is set when the output value requested by a driver is not greater than the total available output value.

* * * * *